United States Patent Office 2,741,597
Patented Apr. 10, 1956

2,741,597

MANUFACTURE OF ALKENYL SUCCINIC ACID

Johan C. D. Oosterhout and Willis L. Banks, Port Arthur, and William F. Glassmire, Groves, Tex., assignors to The Texas Company, New York, N. Y., a corporation of Delaware No Drawing. Application March 8, 1952,
Serial No. 275,656

1 Claim. (Cl. 252—56)

This invention relates to a novel monomeric copolymerization product of propylene tetramer with maleic anhydride, and the acid hydrolysis product thereof, and to their method of manufacture. The invention also relates to a mineral lubricating oil composition containing the said acid hydrolysis product.

The hydrolyzed reaction product of maleic anhydride with an olefin having from 6 to 18 or more carbon atoms in the molecule has found rather extensive use as an anti-corrosive or anti-rust additive for mineral lubricating oils, such as turbine and hydraulic oils (cf. U. S. Patent No. 2,452,319). The hydrolyzed reaction product has been variously referred to in the literature as alkyl maleic acid or alkenyl succinic acid, depending on whether the unsaturation remains in the dicarboxylic acid chain or is in the hydrocarbon side chain, or whether the product is a mixture thereof. In the past, the reaction product has been prepared from higher molecular weight olefins formed by the cracking of mineral oils or high molecular weight paraffin hydrocarbons such as paraffin wax, by the dehydrogenation of higher molecular weight alcohols, and by the polymerization of $C_4$ unsaturated hydrocarbon fractions or mixtures of lower molecular weight hydrocarbons containing substantial proportions of butylenes.

While the hydrolyzed reaction products heretofore prepared from the foregoing types of olefins have been used with substantial success, certain difficulties have arisen particularly in their utilization as anti-rust additives for turbine and hydraulic oils. Thus, the products have not been uniformly effective in inhibiting both paraffin base and naphthene base lubricating oils, and their effectiveness has not been as consistent as desired. Moreover, the yields obtained on the basis of the maleic anhydride charged have been low.

In accordance with the present invention, it has been discovered that the foregoing difficulties can be overcome by a novel monomeric copolymerization product of propylene tetramer with maleic anhydride, followed by the hydrolysis of the reaction product. By the use of the particular propylene tetramer of acyclic unsaturated branched chain structure boiling within the range of about 350–480° F. as the reactant with maleic anhydride, an alkenyl succinic acid of improved uniform quality can be regularly prepared in substantially improved yield, and which is uniformly effective as an anti-rust additive in both paraffin base and naphthene base lubricating oils, such as turbine and hydraulic oils. The present invention also provides improved methods for preparing this product in purified form.

It is known that propylene polymers prepared by the polymerization of substantially pure propylene, or a hydrocarbon fraction containing propylene as substantially the sole olefin constituent, possess acyclic structure with side chain methyl branching which is entirely distinct from polymers produced from butylenes (cf. U. S. Patent No. 2,477,382). This is represented by the following type of compound found in the propylene tetramer fraction $$CH_2=CH-CH_2-\underset{CH_3}{\underset{|}{CH}}-CH_2-\underset{CH_3}{\underset{|}{CH}}-CH_2-\underset{CH_3}{\underset{|}{CH}}-CH_3$$

While the propylene tetramer fraction consists of various isomeric compounds of the foregoing acyclic branched chain structure, such that the propylene tetramer fraction does not present any well defined plateau but rather has a progressively increasing boiling range even when fractionated on an efficient fractionating column, the above listed structural formula is representative of these isomeric propylene tetramer compounds which are distinguished from butylene polymers by freedom from quaternary carbon atoms and by single methyl group branching on the acyclic chain.

Reaction or copolymerization of the above type of propylene tetramers with maleic anhydride has been found to occur without substantial fragmentation of the alkylene groups which is characteristic of butylene polymers, thereby producing a propylene tetramer monomeric copolymerization product with maleic anhydride consisting essentially of isomeric compounds, each having a single acyclic unsaturated alkenyl side chain with methyl group branching represented by the formula

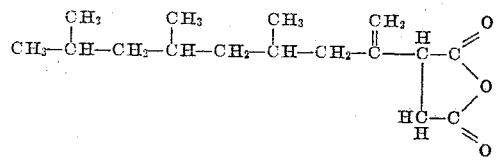

Upon hydrolysis, the resulting hydrolyzed propylene tetramer reaction product with maleic anhydride consists essentially of isomeric compounds, each having a single acyclic unsaturated alkenyl side chain with methyl group branching represented by the formula

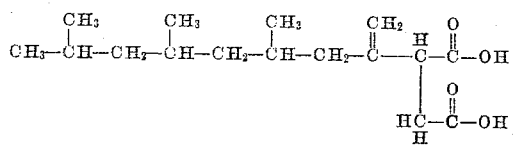

The superior properties and improved yield of this novel alkenyl succinic acid are apparently attributable to the reduction in fragmentation in the reaction and the uniform branched chain character of the isomeric compounds. The method of preparation as subsequently described, which effects a substantially complete separation of these desirable isomeric compounds from other polymers and impurities, also contributes to the superior quality of the product as an anti-corrosive for mineral lubricating oil.

The propylene tetramer may be prepared in good yield by polymerizing substantially pure propylene, or a hydrocarbon fraction containing propylene as substantially the sole olefinic constituent, by contacting with a phosphoric acid catalyst, such as a solid type of catalyst formed by saturating a support of the character of keiselguhr with aqueous orthophosphoric acid. The polymerization is preferably carried out under pressure of about 200–500 lbs. per square inch at a temperature of 300–450° F., utilizing a feed rate of 0.5–1.25 volumes of gas per volume of catalyst per hour. The resulting polymer product is then fractionated to separate the desired tetramer cut which, as pointed out above, boils within the range of 350–480° F. Of course, narrower cuts within this boiling range can be employed. However, from the standpoint of improved yield, it is advantageous to utilize the broader boiling range fraction, since this has been found to have no deleterious effect on ultimate product quality. It will be appreciated that the broader boiling range cut extending up to about 480° F. includes a small proportion of pentamer or polymer in the $C_{12}$–$C_{15}$ range; but the cut is predominantly propylene tetramer. For this reason, and to simplify terminology, the expression "propylene tetramer fraction" is used throughout the specification and claims to signify a propylene polymer cut boiling at atmospheric pressure within the range of 350–480° F.

Another suitable method for forming the propylene tetramer fraction involves polymerizing the propylene under pressure in the presence of a $BF_3 \cdot H_2O$ catalyst at a temperature of about 120–150° F. The $BF_3 \cdot H_2O$ catalyst is prepared by saturating water with $BF_3$ by bubbling the $BF_3$ gas into the water in a vessel until no more of the gas will go into solution, as evidenced by the increased "fog" of escaping gas, or by use of a countercurrent gas absorption tower held at about 8 mm. Hg pressure. In this method, a steel reactor, equipped with a motor-driven stirrer and heating jacket, is conveniently employed. The reactor is first charged with the desired amount of $BF_3 \cdot H_2O$ catalyst, which is usually of the order of about 5–15% and preferably around 10% by weight of the propylene to be added. With heated water being circulated through the jacket of the reactor at the desired reaction temperature of about 120–150° F., the propylene is fed into the reactor with stirring at a feeding pressure of approximately 100 lbs. per square inch. Polymerization starts rapidly and the pressure in the reactor soon drops. The stirring is continued for the desired contact time, usually about 1–2 hours. The reactor is then drained, and the reaction mixture allowed to settle into an upper hydrocarbon layer and a lower catalyst layer. The hydrocarbon layer is then washed with an alkaline solution, such as an aqueous sodium carbonate solution, until the washed layer remains strongly alkaline. The hydrocarbon product is then dried with anhydrous calcium chloride and filtered, using a filter aid. The polymer is then fractionated to separate the desired tetramer fraction.

In the reaction of the propylene tetramer fraction with maleic anhydride, a weight ratio of about 3–5 parts, and preferably 3.5–4.5 parts, of the propylene tetramer fraction to one part of the maleic anhydride are mixed in a reactor equipped with a stirrer at a temperature above 300° F., and up to a temperature approximating or slightly above the initial boiling point of the polymer but below the distillation temperature of any substantial proportion of the reactants at the pressure employed, and preferably at about 330–350° F. at substantially atmospheric or a slight super-atmospheric pressure. The stirred reactants are thus maintained in liquid phase for a period of time in excess of 12 hours and preferably about 18–28 hours. Longer contact times up to about 36 hours may be employed with a slight increase in yield of the alkenyl succinic anhydride on the basis of the polymer charged; but ordinarily, the reduced output due to the longer contact time does not justify the use of more than about 28 hours for the reaction. A weight ratio of about 4:1 of propylene tetramer to maleic anhydride has been found to be substantially optimum from the standpoint of yield of alkenyl succinic anhydride basis the initial ingredients.

In one embodiment of the method of the present invention, the resulting reaction mixture is subjected to a topping distillation to remove lower boiling material, mainly unreacted polymer, which boils at 10 mm. Hg absolute pressure below about 340° F. and preferably below 350° F. The reduced or topped crude reaction product is then distilled under vacuum to separate overhead an alkenyl succinic anhydride fraction consisting essentially of the desired isomeric compounds, each having one acyclic unsaturated branched chain propylene tetramer radical attached to an intermediate carbon atom of a succinic anhydride nucleus, the said overhead alkenyl succinic anhydride fraction boiling at 10 mm. Hg absolute pressure above 340° F. and below 460° F., equivalent to a boiling range of about 630–710° F. at atmospheric pressure. Ordinarily, the preferred overhead distillate fraction has a boiling range at 10 mm. Hg absolute pressure of about 350–450° F. This separates the desired propylene tetramer monomeric copolymerization product with maleic anhydride from higher boiling polymeric reaction products which may amount to about 5–15% by weight of the topped or reduced reaction product.

It has been found that the resulting overhead distillate fraction of alkenyl succinic anhydride contains a small amount of unreacted maleic anhydride as an impurity. This is removed by water washing the overhead distillate at atmospheric temperature prior to the step of hydrolyzing the alkenyl succinic anhydride by heating in the presence of water. The water washing is carried out by gently agitating the overhead distillate fraction in the presence of water so as to avoid emulsification, and at substantially atmospheric temperature or below to prevent hydrolysis, followed by allowing the mass to stand and settle into an aqueous phase containing the dissolved maleic anhydride and an alkenyl succinic anhydride phase. Generally, at least two water washing treatments of this character are utilized prior to hydrolysis. The alkenyl succinic anhydride prepared in accordance with the present invention has a specific gravity closely approaching that of water. Consequently, it is frequently found that in the first washing treatment, the still impure alkenyl succinic anhydride layer will float on top of the aqueous layer; while in the second washing treatment the now pure alkenyl succinic anhydride will sink to the bottom, leaving the water layer on top. Settling times of about 5–8 hours or more are generally allowed for complete separation of the two layers.

The alkenyl succinic anhydride fraction so obtained is a viscous yellow liquid having a specific gravity at 60° F./60° F. of about 1.001–1.014, and with a distillation range at 10 mm. Hg absolute pressure as set forth above with a 5% point minimum of about 360° F. and a 95% point maximum of about 440° F.

The purified alkenyl succinic anhydride is then hydrolyzed in conventional manner by heating in a glass lined kettle with the calculated amount of water at about 180–210° F. for about two hours. The resulting product is a viscous, clear yellow liquid and represents a purified alkenyl succinic acid of high quality. Where the product is to be employed as an additive for mineral lubricating oil, it is preferably manufactured in the form of a lubricating oil concentrate containing about 25–60%, and generally about 50%, active ingredient by weight. This is conveniently accomplished by adding a suitable distillate mineral lubricating oil in controlled amount to the hydrolyzed product in the kettle, and stirring as the contents cool. Ordinarily, only a portion of the required amount of mineral lubricating oil is initially added, and after the temperature of the stirred mix has dropped to about 125° F., the balance of the mineral lubricating oil is then stirred in to produce a concentrate of the desired amount of active ingredient, such as a 50% concentrate.

A further feature of the present invention involves a method of reducing the time required in the settling of the layers during the water washing operation, and prior to the hydrolysis step. This is particularly useful where a mineral lubricating oil concentrate of the alkenyl succinic acid is prepared as the final product. In this alternate procedure, a small proportion of distillate mineral lubricating oil, such as about 10–25% by weight and preferably about 15–20%, is added to the overhead distillate fraction of alkenyl succinic anhydride. The water washing steps are then carried out on the resulting mixture as described above. Since the distillate mineral lubricating oil is miscible with the alkenyl succinic anhydride and lowers the specific gravity thereof to a value substantially less than that of water, more rapid separation of a bottom water layer containing the dissolved maleic anhydride is thereby secured in each of the washing steps. It has been found that the presence of the mineral lubricating oil has no deleterious effect on the subsequent hydrolysis step, and no degradation of the product occurs. Following the hydrolysis step, additional mineral lubricating oil is then added to provide a concentrate of the alkenyl succinic acid containing the amount of active ingredient desired, such as a 50% concentrate.

In a further embodiment of the method of the present invention, the crude reaction mixture resulting from the copolymerization of the propylene tetramer fraction with maleic anhydride in the manner set forth above, is subjected to extraction with an aqueous alakali metal hydroxide solution for purification. In this procedure, the crude reaction mixture is preferably water washed at atmospheric temperature one or more times to remove unreacted maleic anhydride. This water washing is carried out by agitating with water, allowing the mixture to settle and then separating the aqueous phase from the oil phase. Following the water washing treatment, the resulting oil phase is then mixed with a sufficient volume of the aqueous alkali metal hydroxide solution to effect hydrolysis of the alkenyl succinic anhydride and conversion thereof to an alkali metal salt soluble in the aqueous phase. An excess of the alkali metal hydroxide is employed to give a basic test in the resulting aqueous phase.

Any suitable alkali metal hydroxide which forms a water soluble salt with the alkenyl succinic acid can be employed, such as hydroxides of sodium, potassium, lithium, etc. Ordinarily, a caustic soda solution, ranging in strength from about 5 to 30° Bé. i semployed, and preferably a solution of about 15-20° Bé. The extraction can be carried out within the temperature range of 60-150° F., and conveniently is done at atmospheric temperature, although a temperature in the upper part of the range may be used to provide more rapid breaking of the resulting emulsion. The mixture is then allowed to stand to separate into an oil phase consisting largely of the unreacted polymer, and an aqueous phase containing the dissolved sodium salt of the alkenyl succinic acid, and the phases are then separated.

The separated aqueous phase is then acidified, preferably with hydrochloric acid, to split out the alkenyl succinic acid, which latter is separated as an oil phase from the acidified aqueous phase. Complete settling of the phases is not essential at this point, but preferably the more rapidly separated aqueous phase is removed from incompletely settled emulsion and oil phase. The latter may be water washed one or more times, with separation of the aqueous phase which settles rapidly following each washing step; and then the remaining emulsion and oil phase is mixed with a sufficient quantity of a light hydrocarbon solvent, such as light naptha, to dissolve the alkenyl succinic acid. The hydrocarbon extract, following the settling of the remaining aqueous phase, is then separated and neutralized with a light aqueous alkaline solution, such as a dilute sodium bicarbonate solution, to remove residual acidity. The neutralized hydrocarbon extract is water washed to remove salts formed in the neutralization step, and the purified hydrocarbon extract is then distilled to remove overhead the hydrocarbon solvent and any free water and recover the purified alkenyl succinic acid as bottoms. This extraction procedure has been found to give a higher yield of good quality product than is frequently obtained by the distillation procedure described above.

The following examples are given to more particularly illustrate the present invention:

EXAMPLE I

A propylene tetramer fraction, prepared by the polymerization of propylene with a solid phosphoric acid catalyst as described above, followed by fractionation of the resulting liquid product, was selected having the following tests:

| | |
|---|---|
| Gravity, °API | 47.5 |
| ASTM distillation: | |
| IBP | °F 356 |
| 5% | °F 374 |
| 10% | °F 379 |
| 20% | °F 382 |
| 30% | °F 384 |
| 40% | °F 387 |
| 50% | °F 391 |
| 60% | °F 395 |
| 70% | °F 402 |
| 80% | °F 411 |
| 90% | °F 435 |
| 95% | °F 466 |
| EP | °F 474 |
| Recovery, per cent | 98.0 |
| Bromine No. | 102 |
| Flash, °F. | 138 |

75 pounds of maleic anhydride and 42 gallons at 78° F. (274 lbs.) of the said propylene tetramer fraction were charged to a fire heated reactor equipped with a stirrer. The reactor was brought up to 330° F. with stirring, and maintained at that temperature with stirring for nine hours. The temperature was then increased to 350° F. and maintained at the higher temperature with stirring for a further period of 19 hours. The heat was then cut off and stirring stopped. 55 gallons of crude reaction product were drawn at 270° F., said product having a gravity of 38° API.

41 gallons of the foregoing crude reaction product were then charged to a topping still at 250° F. and the product distilled over a period of 10 hours. The temperature of the still was gradually raised to 400° F. at a slight vacuum equivalent to an absolute pressure of 29.4–30.0 inches of mercury. The overhead from the still amounted to 23.5 gals. at 72° F. having an API gravity of 47.0, and was mainly unreacted propylene polymer. The bottoms amounted to 13 gals. at 102° F. having an API gravity of 7.0. This was the reduced or topped crude alkenyl succinic anhydride containing higher boiling impurities.

17,225 grams of the foregoing topped product were then charged to a high vacuum still where the distillation was continued under high vacuum equivalent to 3.7–11 mm. Hg absolute pressure. Topping of the product was continued until the temperature of the still reached 342° F. at 3.7 mm. Hg absolute pressure, equivalent to 638° F. at atmospheric pressure. This overhead, consisting of 825 grams (4.8% by weight of the charge) was discarded. Distillation under the said high vacuum was then continued for about 7 hours until the temperature reached 449° F. at 6.9 mm. Hg absolute pressure, equivalent to 700° F. at atmospheric pressure. The overhead distillate fraction of the desired alkenyl succinic anhydride boiling within the range 638–700° F. at atmospheric pressure amounted to 13,700 grams or 79.5% of the charge. The bottoms remaining in the still amounted to 2390 grams or 13.9% by weight of the charge, and represented the higher boiling polymeric impurity which was discarded. The loss on the hub vacuum distillation was 310 grams of 1.8% by weight of the charge.

The overhead distillate alkenyl succinic anhydride fraction so obtained was a viscous slightly cloudy yellow liquid having the following tests:

| | |
|---|---|
| Distillation, range, °F. at 10 mm.: | |
| 5% point | 371 |
| 95% point | 403 |
| Specific gravity, 60° F./60° F. | 1.004 |

Other batches of alkenyl succinic anhydride overhead fraction were prepared in the foregoing manner, said batches having a distillation range at 10 mm. Hg absolute pressure with a 5% point minimum of about 360° F. and a 95% maximum of about 440° F., equivalent to a distillation range at atmospheric pressure of about 630–710° F. The specific gravity at 60° F./60° F. varied between about 1.001 and 1.014.

320 lbs. of the said combined overhead alkenyl succinic anhydride fractions were charged to a glass lined kettle equipped with a three-bladed impeller type agitator with adjustable baffle having a stirring speed of 93 R. P. M. 25 gals. of distilled water were added to the kettle and the contents swirled carefully 3 times to avoid emulsification and then allowed to stand 5–8 hours for the water to separate. The above operation was carried out at room temperature. The lower water layer containing dissolved maleic anhydride impurity was drawn off from the supernatant alkenyl succinic anhydride layer. 25 additional gals. of distilled water were then added, the contents swirled carefully as above and then allowed to stand overnight for settling. In this case, the water phase was the supernatant layer which was separated by withdrawing the alkenyl succinic anhydride from the bottom of the kettle, and then discharging the water.

The resulting purified alkenyl succinic anhydride was recharged to the kettle together with 5 gals. of distilled water. Stirring was started and heat applied slowly to bring the temperature to about 180° F. in one hour. Stirring continued for about 2 hours at 180–210° F. to effect hydrolysis and the removal of excess water. 100 lbs. of a solvent refined dewaxed distillate mineral lubricating oil of the turbine oil type having an SUS viscosity at 100° F. of 485–515 was added to the kettle, and stirred with the contents as the temperature dropped to 125° F. Additional lubricating oil of the same type was then added to give a 50% concentrate of the alkenyl succinic acid.

EXAMPLE II

The following example is listed to illustrate the alternate procedure, wherein a proportion of the mineral lubricating oil is added to the overhead distillate fraction of alkenyl succinic anhydride prior to the water washing and hydrolysis steps. In this case, 20% by weight of a distillate mineral lubricating oil of the turbine oil type, as listed above, was added to the overhead distillate alkenyl succinic anhydride. The water washing steps were then carried out as in the foregoing example, except that in this case the aqueous phase was always the lower layer and settled very rapidly. The hydrolysis step was then carried out in the same manner; and finally additional mineral lubricating oil was added to produce a 50% concentrate of the alkenyl succinic acid. No degradation of the product was found; and the kettle time for washing and hydrolysis was reduced from 33 hours for the procedure in Example I to less than 9 hours for the present procedure.

EXAMPLE III

The following example is listed to more particularly illustrate the modified method employing the extraction procedure. 500 cc. of a crude reaction mixture resulting from the copolymerization of the propylene tetramer fraction with maleic anhydride as in Example I above, were mixed with an equal volume of water at 83° F., and the mixture allowed to stand. In ten minutes of settling time, a clear yellow water layer separated from a reddish brown and somewhat cloudy oil layer. The water layer was removed and the washing operation repeated with an equal volume of fresh water. 490 cc. of oil layer at 72° F. were recovered from this second washing step. A 15° Bé. aqueous caustic soda solution was then slowly added with stirring to the separated oil layer. After 300 cc. of the caustic soda solution had been introduced in five minutes' time, the mixture was then stirred an additional fifteen minutes, the temperature of the mixture at this time being 110° F. It was then allowed to stand about five hours, when 325 cc. of an upper oil layer had separated from 460 cc. of a lower slightly cloudy aqueous layer of basic reaction.

The resulting aqueous layer was separated and mixed with 300 cc. of a 50% hydrochloric acid to split out the alkenyl succinic acid, and the mixture allowed to stand for twenty minutes. 530 cc. of an aqueous phase were then removed, and 250 cc. of fresh wash water added and mixed with the remaining oil phase. On standing for 10 minutes, 160 cc. of a separated water phase were removed; and 250 cc. additional fresh water were then mixed with the partially settled emulsion. After 5 minutes, 270 cc. of an aqueous layer were removed; and 250 cc. of fresh water were again added to the incompletely settled emulsion, and the mixture allowed to stand overnight.

At this time, it had separated into three phases, namely, a bottom light brown viscous oil layer of 140 cc., a middle orange-yellow layer of 365 cc. and a top aqueous layer of 80 cc. The middle and bottom layers were removed and combined, and 250 cc. of light naphtha added and mixed therewith. Following settling for fifteen minutes, 285 cc. of an aqueous phase were separated and discarded, and 100 cc. of a 2% sodium bicarbonate solution then mixed with the remaining product and allowed to settle. The bicarbonate wash was then removed and the product mixed with 250 cc. of fresh wash water and allowed to stand for three hours. A clear oil phase was separated from the wash water phase, and the oil phase then evaporated on a steam bath while blowing with air for two hours. At this time, the light naphtha solvent and any remaining water had been removed, and 182 grams of a dark red syrupy liquid constituting the desired alkenyl succinic acid were recovered. This was mixed with an equal weight of a mineral lubricating oil of the turbine oil grade to provide a 50% concentrate of the desired product. In this particular run, the yield of purified alkenyl succinic acid obtained by this caustic extraction procedure amounted to 26% by weight more than was obtained by the distillation procedure of Example I, as based on the crude reaction mixture initially charged. The increase in yield by the caustic extraction procedure amounted to 55% over that obtained in another run by the distillation procedure.

The following data is illustrative of the superior uniform quality of the present alkenyl succinic acid prepared from the propylene tetramer fraction, as compared to the products previously known and utilized which were prepared from $C_{12}$ olefins from other sources by the heretofore conventional methods of reacting the said olefins with maleic anhydride and then hydrolyzing. In each case, the products were added in the listed proportions to a base mineral lubricating oil of the turbine oil grade containing the following additives:

| | Percent by weight |
|---|---|
| 4-methyl 2,6-ditertiary butyl phenol | 0.3 |
| Mixed mono- and dilauryl acid orthophosphates | 0.0025 |
| Phenol | 0.005 |
| Dimethyl silicone polymer concentrate (10 grams of dimethyl silicone polymer of 100 centistokes viscosity at 100° F. diluted to a volume of 100 cc. with a refined water white kerosene) | 0.001 |

Base oil A in the following table was a naphthene base refined distillate mineral lubricating oil having an SUS viscosity at 100° F. of about 485–515 seconds. Base oil B in the following table was a paraffin base refined distillate mineral lubricating oil having an SUS viscosity at 100° F. of about 173–187 seconds. The said base oils containing the foregoing listed additives in the proportions stated, were blended with the indicated proportions of the alkenyl succinic acid prepared from the various olefin sources as listed in the table, and were subjected to the modified ASTM rusting test, as described in Patent No. 2,452,319, col. 6, line 43 to col. 7, line 32. The following results were obtained:

Table
Modified ASTM rusting test

1. Base oil A+listed additives+0.015% by weight of alkenyl succinic acid prepared from C₁₂ olefins obtained from the dehydrogenation of alcohol _____ Fail
2. Base oil A+listed additives+0.023% by weight of the alkenyl succinic acid of run 1 above _____ Pass
3. Base oil A+listed additives+0.015% by weight of alkenyl succinic acid prepared by C₁₂ olefins obtained from the cracking of paraffin wax _____ Pass
4. Base oil B+listed additives+0.015% by weight of the alkenyl succinic acid of run 3 _____ Fail
5. Base oil B+listed additives+0.015% by weight of the alkenyl succinic acid prepared from propylene tetramer fraction in accordance with this invention _____ Pass The foregoing results show that the previously prepared alkenyl succinic acids were not uniformly effective even in naphthene base mineral lubricating oils in this modified ASTM rusting test. Also, previously prepared products which would pass the said modified ASTM rusting test in naphthene base oils were unsatisfactory in paraffin base oils which are more difficult to inhibit. On the other hand, the product of the present invention satisfactorily inhibited the more difficult paraffin base lubricating oil, when used in the small proportion desired so as not to interfere with other desirable properties of the turbine or hydraulic oil, and proved to be uniformly effective in both naphthene and paraffin base oils in passing this modified ASTM rusting test.

Ordinarily, a proportion of the alkenyl succinic acid (active ingredient) within the range of 0.01 and 0.025% by weight is employed in a turbine or hydraulic oil of this character in conjunction with other additives of the character listed above. It will be understood that other suitable oxidation inhibitors can be substituted for the 4-methyl 2,6-ditertiary butyl phenol, such as tetramethyl diamino diphenyl methane. While concentrates of the present alkenyl succinic acid containing the amount of active ingredient as listed above are preferred, it will, of course, be understood that lower concentrations of active ingredient can be employed and the present invention contemplates a mineral lubricating oil containing from about 0.01% to about 60% by weight of the active ingredient, namely, the alkenyl succinic acid prepared as described above.

The yield of alkenyl succinic acid (active ingredient) prepared from the propylene tetramer fraction in accordance with the present invention has been found to be as high as 169% by weight basis the maleic anhydride charged. This compares with yields of about 84–148% by weight based on the maleic anhydride obtained with a butylene polymer fraction of comparable boiling range (350–450° F.), and with even lower yields obtained with olefins from other sources. This further illustrates the result of undesired fragmentation, as well as losses to higher boiling polymer material, which occur in the reaction of maleic anhydride with the butylene polymer and with the olefins from other sources. The product of the present invention, on the other hand, is of more uniform isomeric character resistant to these undesired fragmentation or heavy polymer reactions, thereby affording substantially higher yields and producing an anti-corrosive of superior uniform quality.

Obviously many modifications and variations of the invention, as hereinbefore set forth, may be made without departing from the spirit and scope thereof, and therefore only such limitations should be imposed as are indicated in the appended claims.

We claim:

A method for manufacturing alkenyl succinic acid from the reaction product of a propylene tetramer fraction with maleic anhydride which comprises subjecting said reaction product to distillation to obtain an alkenyl succinic anhydric fraction as an overhead distillate, said alkenyl succinic anhydride fraction having a specific gravity approximating that of water, mixing said alkenyl succinic anhydride fraction with about 10–25% by weight of a mineral lubricating oil, adding water to wash the mixture of alkenyl succinic anhydride and mineral lubricating oil under conditions including atmospheric temperature to avoid hydrolysis and emulsification, allowing the resulting mixture to separate into a lower aqueous phase and an upper oil phase containing purified alkenyl succinic anhydride, separating said oil phase and then hydrolyzing the same with water at an elevated temperature followed by the addition of a further quantity of mineral lubricating oil to thereby recover a lubricating oil concentrate of purified alkenyl succinic acid.

References Cited in the file of this patent

UNITED STATES PATENTS

| Number | Name | Date |
|---|---|---|
| 2,230,005 | Moser | Jan. 28, 1941 |
| 2,283,214 | Kyrides | May 9, 1942 |
| 2,297,039 | Van Melsen | Sept. 29, 1942 |
| 2,360,426 | Kyrides | Oct. 17, 1944 |
| 2,402,825 | Lowell | June 25, 1946 |
| 2,452,320 | Kluge et al. | Oct. 26, 1948 |
| 2,496,358 | Ramsey et al. | Feb. 7, 1950 |

FOREIGN PATENTS

| Number | Country | Date |
|---|---|---|
| 801,919 | France | May 30, 1936 |